US010918953B1

(12) United States Patent
Pickens et al.

(10) Patent No.: US 10,918,953 B1
(45) Date of Patent: *Feb. 16, 2021

(54) CONTROLLED-ENVIRONMENT FACILITY GAMING SERVICE

(71) Applicant: Securus Technologies, Inc., Carrollton, TX (US)

(72) Inventors: Connor Pickens, Little Elm, TX (US); Alexander Noland, North Richland Hills, TX (US)

(73) Assignee: Securus Technologies, LLC, Carrollton, TX (US)

( * ) Notice: Subject to any disclaimer, the term of this patent is extended or adjusted under 35 U.S.C. 154(b) by 267 days.

This patent is subject to a terminal disclaimer.

(21) Appl. No.: 15/971,215

(22) Filed: May 4, 2018

(51) Int. Cl.
| | |
|---|---|
| A63F 13/00 | (2014.01) |
| A63F 13/73 | (2014.01) |
| H04L 29/06 | (2006.01) |
| H04W 48/02 | (2009.01) |
| H04M 1/725 | (2021.01) |

(52) U.S. Cl.
CPC .......... *A63F 13/73* (2014.09); *H04L 63/0861* (2013.01); *H04M 1/72544* (2013.01); *H04W 48/02* (2013.01)

(58) Field of Classification Search
CPC .......... H04W 12/0027; A63F 2300/552; A63F 2300/534; A63F 13/30; A63F 13/00
See application file for complete search history.

(56) References Cited

U.S. PATENT DOCUMENTS

| | | | | |
|---|---|---|---|---|
| 2011/0126255 | A1* | 5/2011 | Perlman | H04N 19/14 725/116 |
| 2013/0205016 | A1* | 8/2013 | Dupre | H04L 41/0896 709/224 |

* cited by examiner

Primary Examiner — Omkar A Deodhar
Assistant Examiner — Eric M Thomas
(74) Attorney, Agent, or Firm — Fogarty LLP

(57) ABSTRACT

Systems, methods and devices provide gaming services to residents of a controlled-environment facility. A first network interface of a device provides a restricted-bandwidth connection to a gaming system via one or more network access points located within the facility. A second network interface of the device establishes a second connection with the gaming system via a high-bandwidth connection in order to download one or more games to the device. Once the device is disconnected from the high-bandwidth connection, a request for the resident to access a downloaded game is issued to the gaming system via the restricted-bandwidth connection. An authorization key granting temporary access to the game is transmitted to the device via the restricted-bandwidth connection. The resident has access to the game until expiration of the authorization key is detected. The authorization key may expire based on duration of gameplay or based on gameplay progress.

20 Claims, 3 Drawing Sheets

CONTROLLED-ENVIRONMENT FACILITY GAMING SERVICE

TECHNICAL FIELD

The following description relates generally to communications devices provided to residents of a controlled-environment facility, and more particularly to gaming services provided via communications devices to residents of a controlled-environment facility.

BACKGROUND OF THE INVENTION

It is estimated that over two million individuals are incarcerated in U.S. prisons and jails. In general, inmates that have been convicted of felony offenses serve longer sentences in prisons (e.g., federal or state prisons), whereas inmates that have been convicted of misdemeanors receive shorter sentences that are frequently served in local jails (e.g., county jail). In addition, upon being detained by authorities, an inmate may serve significant periods of time incarcerated in a local jail while awaiting release on bond and, in some cases, while awaiting trial. During all of these periods of incarceration, an inmate may have opportunities to communicate with the outside world.

By allowing inmates to communicate with friends and family while incarcerated, the justice system aims to facilitate their transition back into society upon release. Traditional visitation sessions provided by controlled-environment facilities include telephone calls and in-person visits. More recently, technological advances have allowed controlled-environment facilities to provide other types of monitored visitation sessions, including audio conferences, video conferences, video messages, email, and online chat sessions. More recently, visitation sessions may be conducted via portable communications devices issued to inmates on a temporary or permanent basis.

In addition to providing increased opportunities for visitations, additional services may be provided to inmates via an issued portable communications device. For instance, a portable communications device may provide residents with educational and counseling services. A portable communications device may also be used to provide residents with entertainment services, such as gaming services and access to digital content. The availability of such services may be limited based on bandwidth limitations within a controlled-environment facility. In many scenarios, the demand for wireless bandwidth within a controlled-environment facility far exceeds the bandwidth that is actually available. These bandwidth limitations are magnified as greater numbers of portable communications devices are issued.

BRIEF SUMMARY

In various embodiments, communications devices provide gaming services to a resident of a controlled-environment facility. The devices include a first network interface configured to establish a restricted-bandwidth connection with a gaming system via one or more network access points located within the controlled-environment facility; a second network interface configured to establish a second connection with the gaming system via a high-bandwidth connection; a memory device configured to store operating system program instructions; and one or more processors configured to execute the operating system program instructions, causing the communications device to: connect with the gaming system via the high-bandwidth connection to download one or more games to the memory device; issue a request for the resident to access a first game of the one or more downloaded games, wherein the request is issued to the gaming system via the restricted-bandwidth connection; receive, via the restricted-bandwidth connection, an authorization key authorizing a temporary access to the first game; and allow the resident to utilize the first game until expiration of the authorization key is detected.

In certain additional embodiments, the communications devices include one or more sensors configured to collect biometric indicators, wherein the operating system program instructions further cause the communications device to require positive identification of the resident based on collected biometric indicators prior to issuing the request for access to the first game. In certain additional communications device embodiments, the operating system program instructions further cause the communications device to periodically require positive re-identification of the resident based on collected biometric indicators during the temporary access to the first game by the resident. In certain additional communications device embodiments, the authorization key expires upon expiration of a first duration of access to the first game by the resident. In certain additional communications device embodiments, the authorization key expires upon the resident reaching one or more progress milestones in the first game. In certain additional communications device embodiments, the operating system program instructions further cause the communications device to save a progress of the resident in the first game upon detecting the expiration of the authorization key and further configured to revoke the temporary access to the first game upon saving the progress. In certain additional communications device embodiments, operating system program instructions further cause the communications device to provide the resident with an interface for selecting a plurality of the downloaded one or more games to be replaced in a subsequent high-bandwidth connection to the gaming service.

In various embodiments, systems providing a resident of a controlled-environment facility with gaming services. The systems include: one or more network access points coupled to a gaming service; the gaming service configured to communicate with a resident communications device via a restricted-bandwidth connection supported by the one or more access points and further configured to communicate with the resident communications device via a high-bandwidth connection, and further configured to download one or more games to the resident communications device via the high-bandwidth connection, and further configured to receive a request via the restricted-bandwidth connection for temporary access to a first game of the downloaded one or more games, and further configured to issue an authorization key to the resident communication device via the restricted bandwidth connection, wherein the authorization key authorizes temporary access by the resident to the first game; and the resident communications device assigned to the resident, wherein the communications device is configured to connect to the gaming service via the high-bandwidth connection to download the one or more games, and further configured to issue the request via the restricted-bandwidth connection for the resident to access to the first game, and further configured to receive the authorization key from the gaming service via the restricted-bandwidth connection, and further configured to allow the resident to utilize the first game until expiration of the authorization key is detected.

In certain additional system embodiments, the resident communications device comprises one or more sensors configured to collect biometric indicators, and wherein the communications device requires positive identification of the resident based on collected biometric indicators prior to issuing the request for access to the first game. In certain additional system embodiments, the communications device is further configured to periodically require positive re-identification of the resident based on collected biometric indicators during the temporary access to the first game by the resident. In certain additional system embodiments, the authorization key expires upon expiration of a first duration of access to the first game by the resident. In certain additional system embodiments, the authorization key expires upon the resident reaching one or more progress milestones in the first game. In certain additional system embodiments, the communications device is further configured to save a progress of the resident in the first game upon detecting the expiration of the authorization key and further configured to revoke the temporary access to the first game upon saving the progress. In certain additional system embodiments, the communications device is further configured to provide the resident with an interface for selecting a plurality of the downloaded one or more games to be replaced in a subsequent high-bandwidth connection to the gaming service.

In various embodiments, methods provide a resident of a controlled-environment facility with gaming services via a communications device utilized by the resident. The methods include: establishing a first connection with the communications device via a high-bandwidth connection; determining one or more games available to the resident; downloading a plurality of the one or more games to the resident device via the high-bandwidth connection; receiving a request for the resident to access a first game of the one or more downloaded games, wherein the request is received via a restricted-bandwidth connection provided via one or more network access points located within the controlled-environment facility; generating a key authorizing a temporary access to the first game, wherein the duration of the temporary access is determined based on gaming credits available to the resident; transmitting the key to the resident device via the restricted-bandwidth connection; and receiving a notification that the key has expired from the resident device via the restricted-bandwidth connection.

In certain additional method embodiments, the downloading of the plurality of games further comprises: determining one or more game previously downloaded to the communications device; identifying saved progress on the resident device for the one or more previously downloaded games; determining one or more previously downloaded games to be uninstalled from the resident device, wherein the games to be uninstalled do not include the games with saved progress; and downloading the plurality of games to the communication device by replacing one or more of the games to be uninstalled. In certain additional method embodiments, the key expires upon expiration of a first duration of access to the first game by the resident. In certain additional method embodiments, the key expires upon the resident reaching one or more progress milestones in the first game. In certain additional method embodiments, the games to be uninstalled also do not include one or more of the downloaded games that have been designated by the resident. In certain additional method embodiments, the one or more games available to the resident are determined based on a privilege status classification of the resident.

BRIEF DESCRIPTION OF THE DRAWINGS

Figure 1:
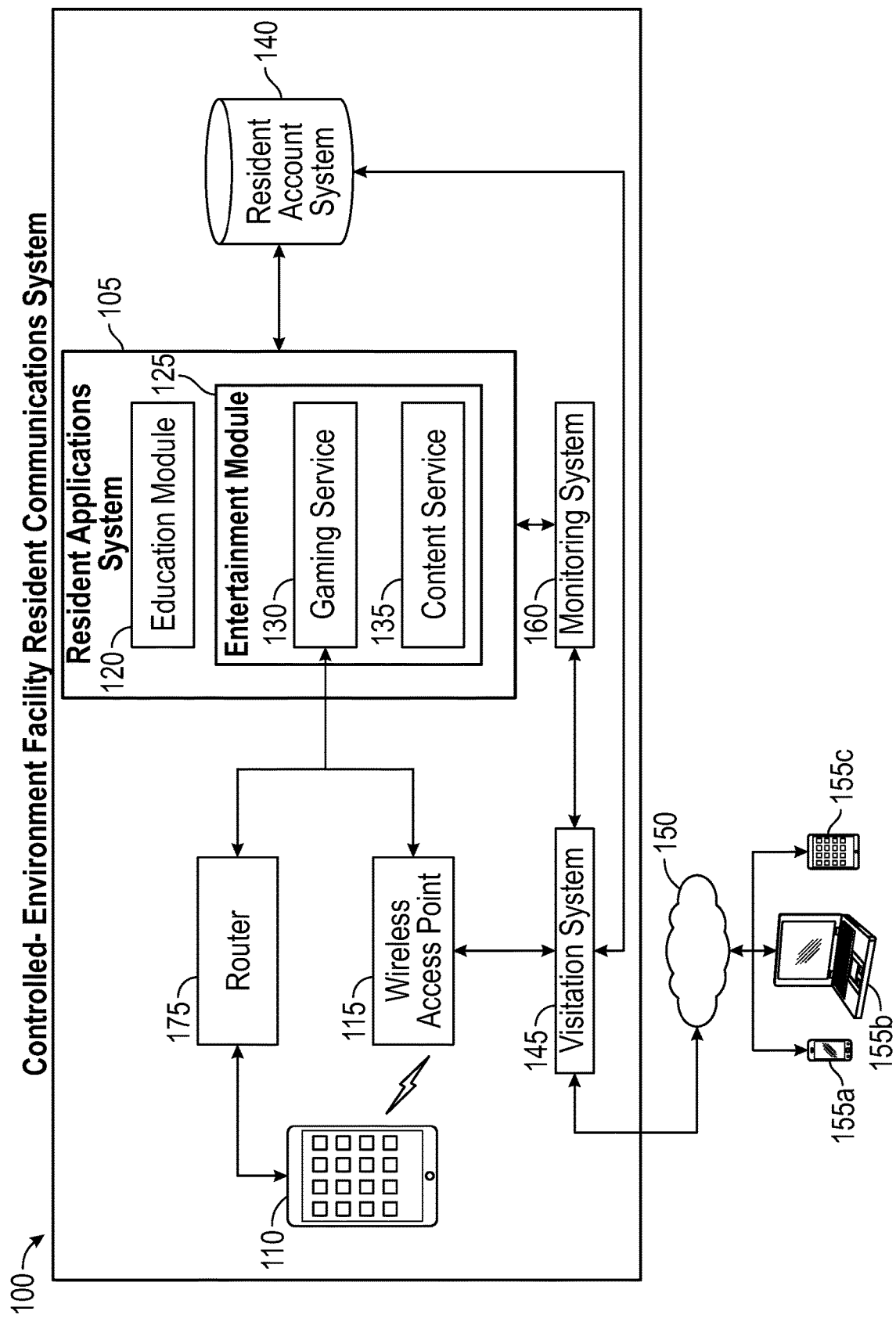

Having thus described the invention in general terms, reference will now be made to the accompanying drawings, which are not necessarily drawn to scale, and wherein:

FIG. 1 is a diagram illustrating certain components of a system according to various embodiments for providing gaming features of communications devices provided to residents of a controlled-environment facility.

Figure 2:
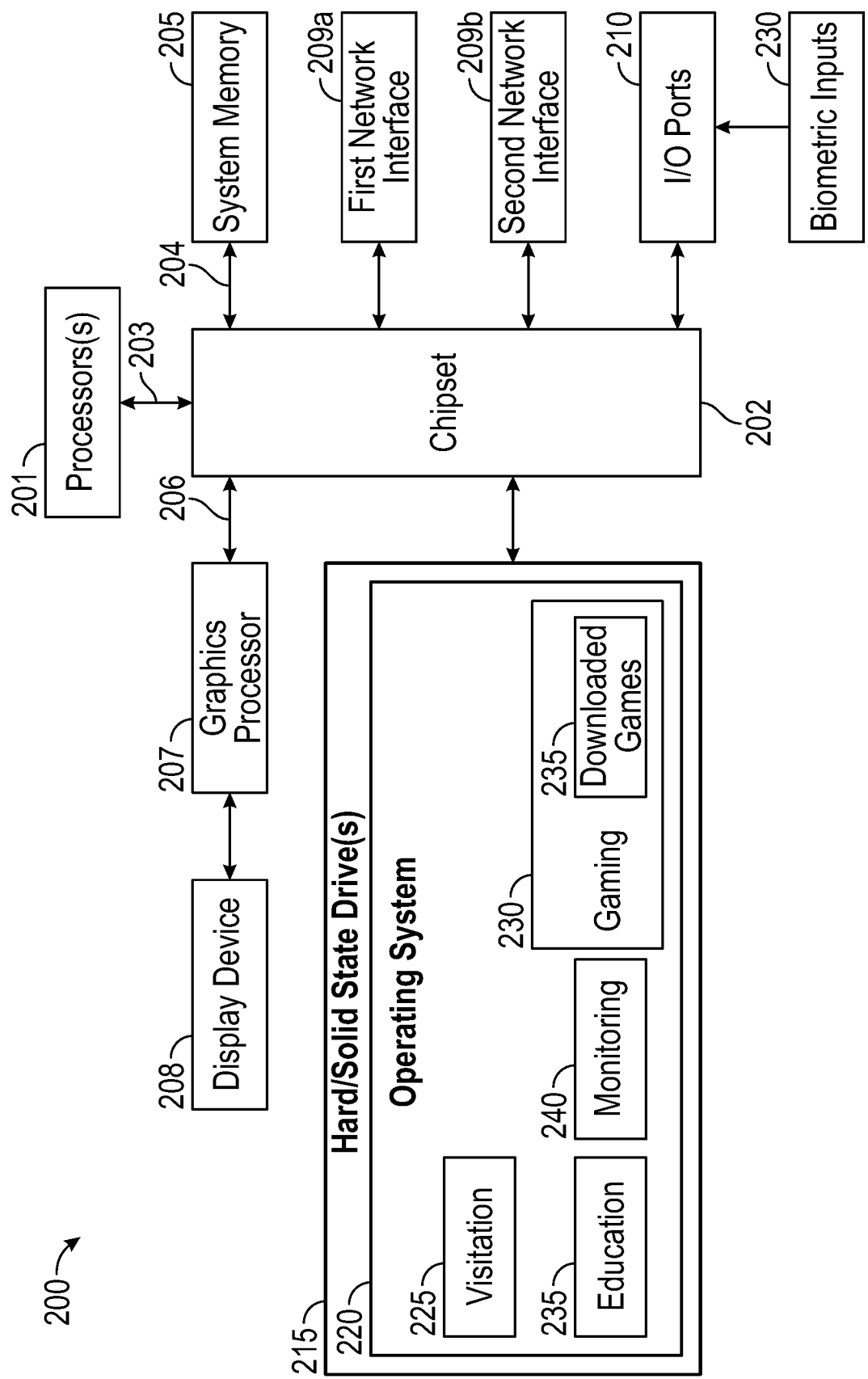

FIG. 2 is a diagram illustrating certain components according to various embodiments of a portable communications device including gaming features provided to residents of a controlled-environment facility.

Figure 3:
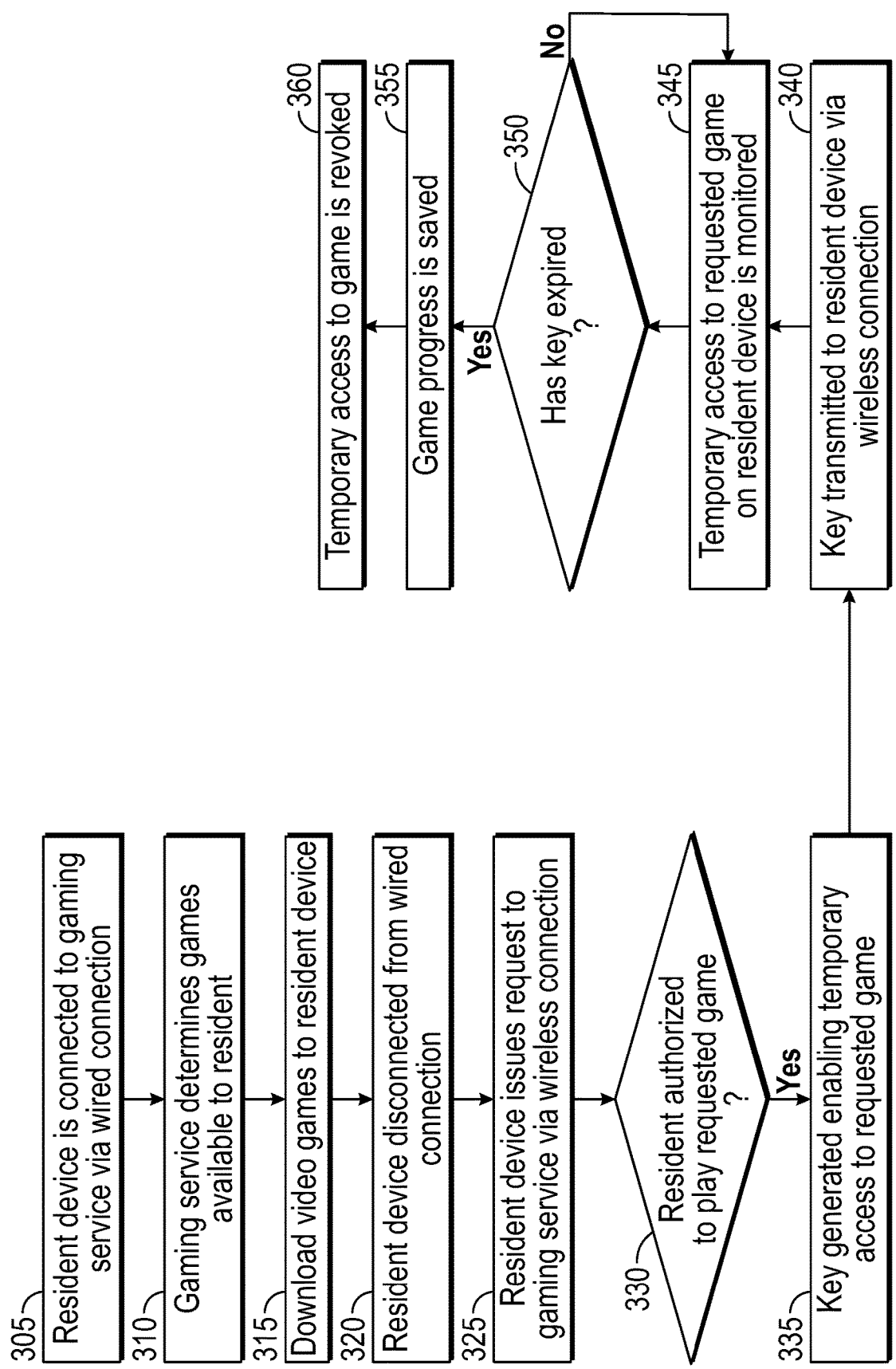

FIG. 3 is a flowchart diagram illustrating certain steps of process according to various embodiments for providing a gaming service to residents of a controlled-environment facility.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, embodiments may be implemented within various types of controlled-environment facilities, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), certain healthcare facilities (e.g., certain hospitals and nursing homes, certain mental health facilities, certain rehabilitation facilities, such as drug and alcohol rehabilitation facilities, etc.), certain restricted living quarters (e.g., barracks, certain dormitories, etc.), certain educational facilities, and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

FIG. 1 is a diagram illustrating certain components of a resident communications system 100 provided within a controlled-environment facility according to various embodiments. In a controlled-environment facility, the resident communications system 100 may provide residents with a variety of services. In certain instances, the resident may utilize the services provided by the resident communications system 100 via a resident communications device 110. In the illustrated embodiment, resident communications system 100 provides residents with visitation session services via a visitation system 145, where the resident may utilize certain of these visitation session services via a supported resident communications device 110, that may be a portable communications device 110 such as a tablet configured for use in a controlled-environment facility. As illustrated, resident communications system 100 also provides residents with a resident applications system 105 that interfaces with the resident communications device 110 in order to provide various approved software applications to the resident, such as educational, counseling and entertainment software. In certain embodiments, the entertainment software available via the resident communications device 110 may include video games that are pre-loaded and temporarily enabled by the resident communications system 100. In various embodiments, resident communications system 100 may provide residents with a variety of additional services via a resident communications device 110.

In certain embodiments, resident communications system 100 may be located within a controlled-environment facility, and may be used to provide communications services to residents located at that particular facility. Alternatively, resident communications system 100 may be centrally and/or remotely located with respect to one or more controlled-environment facilities and be used to provide services to residents at multiple different facilities. Whether local to a particular controlled-environment facility or located remotely, resident communications system 100 may be used to provide communication services, including gaming services, to residents of multiple controlled-environment facilities.

One of the services provided to residents by the resident communications system 100 may include monitored visitation sessions. In the illustrated embodiment, visitation system 145 allows a resident, using resident communications device 110, to participate in a visitation session with a nonresident participating via a communications device 155a-c that connects to the visitation system 145 via an external network 150, such as the Internet. In various embodiments, the visitation system 145 may provide residents with a selection of different visitation session formats including audio conferences, audio messages, video conferences, video messages, email, online chats and/or text messaging services. In certain instances, the visitation formats available to a resident may depend on factors such as: the capabilities of the resident communications device 110, the resident's designated privilege classification within the controlled-environment facility, and restrictions on types of visitations that are allowed with specific nonresidents. As described with respect to the embodiments of FIGS. 2 and 3, visitation system 145 may be configured to allow non-residents 155a-c to enable a resident's temporary access to video games preloaded on the resident communications device 110.

In the illustrated embodiment, the resident communications system 100 utilizes the resident account system 140 in enforcing security protocols that are applicable to the use of services provided to residents of the controlled-environment facility. For instance, in providing visitation services, the visitation system 145 may determine applicable restrictions based on data stored in the resident account system 140. In certain embodiments, the visitation system 145 may interoperate with the resident account system 140 to limit a resident's visitation sessions to sessions with non-residents whose identities are listed in that resident's Pre-Approved Contact (PAC) and/or Personal-Allowed Number (PAN) list. In some scenarios, the visitation system 145 may also enforce restrictions prohibiting a resident from contacting certain individuals identified in a "do not contact" list. The identity of a non-inmate may be represented on these lists by the phone number of the non-resident, the device presented for use by a non-resident and/or the email addresses or other accounts used by the non-resident. Each resident's PAC, PAN, and/or do not contact list(s) may be stored by the resident account system 140. In certain scenarios, resident account system 140 may also be used to store biometric information used to authenticate individual residents of the controlled-environment facility and/or non-residents that have been authorized for certain visitation system 145 services. In addition to PAC, PAN, and/or do not contact list(s), resident account system 140 may also store other security profiles and rules that are applicable to each resident. In certain embodiments, the PAC, PAN, and/or do not contact list(s) may be used to restrict non-residents 155a-c to interact with a resident via the provided gaming services, such as enabling access for a resident or receiving progress reports from the resident.

The resident account system 140 may also be used to manage information such as balances in a resident's trust, commissary, gaming and/or visitation services accounts. The resident account system 140 may also provide access to other information pertaining to a resident, including for instance a resident's trial schedule, conviction data, criminal record, sentencing data (such as time served, time remaining to be served, and projected release date), counseling history, screening history, cell and cellmate assignments, resident-specific restrictions and warnings, commissary order history, telephone call history, call recordings, known or suspected gang or criminal affiliations, known or suspected affiliates, accomplices, or gang members; and any other information that may be relevant or useful to correctional facility staff to house and maintain residents. In various embodiments, the resident account system 140 may be one or more separate systems, or may be integrated as a component of the resident communications system 100.

Subject to various restrictions and limitations enforced by the visitation system 145, residents may participate in visitation sessions with one or more non-residents 155a-c. Nonresidents may utilize various communications devices in participating in visitation sessions. For instance, a non-resident may participate using a mobile phone 155a, tablet computing device 155c, a personal computer 155b or other communications device capable of interfacing with the visitation system 145. In certain scenarios, a non-resident may participate in a voice visitation session hosted by the visitation system 145 via a traditional telephone via a Publicly Switched Telephone Network (PSTN) interface to the network 150. As described, various other visitation session formats may be supported by visitation system 145. Based on the hardware and software capabilities of the nonresident devices 155a-c, nonresidents may participate in voice, video and/or written (e.g., text, chat, email) visitation sessions.

In the illustrated embodiment, resident communications system 100 includes a monitoring system 160 configured to perform various monitoring operations related to the resident's use of the services provided by the system. In particular, the tools provided by the monitoring system may provide the ability to monitor resident's use of software applications provided via the resident applications system 105, such as the ability to monitor a resident's use of the described gaming services. In certain embodiments, the monitoring system 160 may be configured to collect sensor information from the resident communications device 110 in order to detect unsafe conditions during a gaming session. For instance, the monitoring system 160 may collect sensor information from the resident communications device 110 indicating a level of stress or agitation by the resident during game play. One or more gyroscope sensors included within the resident communications device 110 may be used to detect unsafe handling of the resident communications device 110. Heart rate and blood pressure information detected by sensors worn by the resident may be transmitted via RFID (Radio Frequency Identification) to the resident communications device 110.

The resident communications device 110 may periodically transmit such sensor information to the gaming service in order to establish baselines for use of the individual games by the resident. These baselines may then be transmitted to the resident communications device 110 for use in detecting whether monitored conditions indicate a deviation resulting from a high level of stress and/or agitation by the resident. In certain of such embodiments, the resident communications device 110 may be configured to save the resident's game progress and suspend the gaming session in response to detecting unsafe conditions.

The monitoring system 160 also provides various tools for automated and manual monitoring of visitation sessions conducted via the visitation system 145. The monitoring system 160 may include tools that allow staff to monitor live and recorded visitation sessions. The monitoring system 160 may record the visitation sessions conducted via the visitation system 145, such as by generating written transcripts, audio and/or video files of the visitation session. These recorded visitation sessions may be stored to a database maintained by the monitoring system 160. The monitoring system 160 may also provide tools that allow staff to mark and annotate events observed in a recorded visitation session. The monitoring system 160 may also provide tools that allow staff to search recorded visitation sessions in support of investigative activities. Additional monitoring may be provided by the monitoring system 160 via keyword detection, gesture recognition, and other tools intended to detect unauthorized or illicit behavior during a visitation session.

In certain embodiments, resident communications device 110 may be a personal wireless device, such as a tablet device or a smartphone device. As described in additional detail with regard to the embodiment of FIG. 2, the portable communications device 110 may include a camera, display, microphone and speakers and may allow the resident to participate in visitation sessions supported by the visitation system 145, where such visitation sessions may include voice visitations, video sessions, email, online chats and/or text messaging services. In certain scenarios, a portable communications device 110c may be referred to as an Intelligent Resident Device (IRD), or in a correctional institution environment, as an Intelligent Inmate Device (IID). In certain scenarios, a portable communications device 110c may be sponsored, or otherwise subsidized, by organizations or companies that have contracted with the controlled-environment facility to provide services to residents of the facility.

The portable communications device 110 may be especially adapted in various manners for use in a controlled-environment facility. For instance, in a correctional facility, the portability of a portable communications device 110 may be limited by mounting or otherwise attaching the device on a wall, within a booth or as part of a kiosk. As described in additional detail with regard to the embodiment of FIG. 2, the portable communications device 110 may include various adaptations that prevent unauthorized use of the device by residents. Such adaptations may include various restrictions on the resident's use of services provided by the resident communications system 100. The portable communications device 110 may be assigned for use by a resident on a temporary or permanent basis.

A portable communications device 110 may be restricted with respect to the network connectivity that is provided by the resident communications system 100. In many scenarios, a portable communications device 110 may be configured to connect only to a specific wireless access point 115, or a specific network of wireless access points, provided by the resident communications system 100. In certain embodiments, a portable communications device 110 may be further restricted to connect only to networks available within certain areas of a controlled-environment facility, such as a dedicated visitation area or other supervised area. In certain scenarios, network connectivity for a portable communications device 110 may be limited by placing wireless access points 115 and positioning directional antenna within the physical structure of a controlled-environment facility such that the generated wireless signals are restricted to limited areas within the facility.

As illustrated, the resident applications system 105 may include one or more modules, such as education module 120. These modules provide software applications for use by residents via a resident communications device 110. The education module 120 may be one of many different modules provided for the education and training of residents. For instance, the education module 120 may provide a resident with access to recorded lectures, online classes, coursework materials, self-guided training courses, vocational training materials, job counseling services, job search services, and other such resources provided with the intent to rehabilitate and educate residents.

In addition to providing educational resources, the resident applications system 105 may include an entertainment module 125 that may include a content module 135 used to provide residents with various forms of content, such as recorded videos, live broadcasts, music files, video movies, access to streaming audio, and other audio and video content approved for residents of a controlled-environment facility. In certain embodiments, the content available to a particular resident may depend on a privilege status classification of the resident. For instance, residents having earned additional privileges may be allowed access to additional content via content module 135.

The resident applications system 105 may include a gaming module 130, by which video game services may be provided to residents via a resident communications device 110. The gaming module 130 may support the use of various games approved for residents of a controlled-environment facility. In certain scenarios, residents with low-risk privilege status classifications may be allowed access to certain games that are otherwise unavailable to other higher risk residents. In certain embodiments, a privilege status classification may allow a resident to utilize the provided gaming service by which a resident may be provided with temporary access to video games that have been downloaded onto resident's communications device 110.

In certain embodiments, the gaming module 130 may be configured to support downloading of video games onto supported resident communication devices 110 and subsequent monitoring of use of the video games by residents. The gaming module 130 may also be configured to provide a resident with temporary authorization to play the video games that have been loaded onto the resident communications device 110. In certain embodiments, the gaming module 130 may be configured to download video games to the resident communication devices 110 strictly via a wired connection such as via router 175. In such embodiments, the gaming module may be additionally configured to monitor and administer access to the video games downloaded to the resident communication device 110 via a wireless connection, such as via wireless access point 115.

As described, the demand for wireless bandwidth within a controlled-environment facility typically exceeds the bandwidth that is actually available. Accordingly, in many scenarios, the wireless bandwidth available via the wireless access points 115 in a controlled-environment facility is restricted. In certain embodiments, bandwidth limitations may be enforced via configuration of the wireless access points 115. Bandwidth limitations may additionally or alternatively be enforced via configuration of the network interfaces of the resident communications device 110. In certain scenarios, the bandwidth limitations may serve to prioritize the use of available wireless bandwidth for use of visitation, counseling and education services, such that high bandwidth gaming and entertainment applications available via the resident communications device may be restricted to operations using limited amounts of the bandwidth provided via the wireless access points 115.

In order to support the provided gaming services, the resident communications device 110 may be coupled to the resident application system 105 via a high-bandwidth connection, such as via a router 175 or similar network device that supports a wired connection to the resident communications device 110. In certain embodiments, the high-bandwidth connection may be provided via a USB coupling between a USB port of the resident communications device 110 and a USB port accessible by the gaming service 130. Other embodiments may utilize various other types of high-bandwidth connections between the resident communications device 110 and gaming service 130. In certain embodiments, the high-bandwidth connection may be provided by a wireless network dedicated to administrative tasks, such as configuring resident communication devices 110 for use by residents. In such embodiments, such administrative wireless networks may not be subject to bandwidth restrictions, but may be limited to administrative use and thus not available as a high-bandwidth connection to support gameplay.

In the embodiment of FIG. 1, the resident application system 105 is a component of the resident communications system 100. In certain embodiments, the resident application system 105 may be an external component of the resident communication system 100. In certain embodiments, one or more of the functions of the resident application system 105 may be provided by systems external to the resident communications system 100. In certain of such embodiments, one or more of the functions of the resident application system 105 may be provided by centralized systems external to the controlled-environment facility.

FIG. 2 is a block diagram of a communications device 200 configured according to certain embodiments for use by a resident of a controlled-environment facility. In various embodiments, the communications device 200 may correspond to a portable communications device 110, such as described with respect to FIG. 1. In particular, the communications device 200 may be configured to provide a resident with access to the described gaming features. In particular, the communications device 200 may be configured to utilize a first high-bandwidth network interface 209a for downloading games to the device, and to utilize a second restricted-bandwidth network interface 209b for authorized and administering temporary access to the downloaded games.

In certain scenarios, the communications device 200 allows residents to utilize various services provided by the resident communications system, such as described with respect to FIG. 1. The communications device 200 may be configured to interoperate with the resident communications system to utilize software applications that have been approved, and in some cases modified, for use by residents of a controlled-environment facility. Also as described with regard to FIG. 1, in certain embodiments, the resident communications system may be configured such that the resident may utilize the communications device 200 to participate in visitation sessions, including audio and/or video visitation sessions.

In various embodiments, the communications device 200 may be installed within a hardened enclosure that prevents any modifications to the hardware of the device and to prevent any tampering with the device that could allow a resident to conceal contraband within the device. In certain embodiments, the communications device 200 may be a tablet device, such as portable communications device 110, that is protected within a hardened case that allows the resident to handle and use the portable device, but prevents the resident from accessing any of the device's internal components.

In certain embodiments, one or more sensors, such as biometric sensors 230, may be integrated into the communications device 200 in order to detect any attempts to compromise the enclosure of the device. In certain embodiments, the communications device 200 may be configured to issue an alert to the resident communications system if the sensors indicate any attempts by a resident to compromise the enclosure of the device. In certain embodiments, the communications device 200 may be configured to shut down upon the sensors detecting an attempt to compromise the device, or in response to the sensors detecting sudden movements indicative of a resident's rough handling of the device. Various additional features of the hardware and/or software of the communications device 200 may be modified in order to prevent unauthorized use of the device.

Communications device 200 may include one or more processors 201. In various embodiments, the communications device 200 may be a single-processor system including one processor 201, or a multi-processor system including two or more processors 201. Processor(s) 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

Communications device 200 may include a chipset 202 that may include one or more integrated circuits that are connected to processor(s) 201. In certain embodiments, the chipset 202 may utilize a QPI (QuickPath Interconnect) bus 203 for communicating with the processor(s) 201. Chipset 202 provides the processor(s) 201 with access to a variety of resources. For instance, chipset 202 provides access to system memory 205 over memory bus 204. System memory 205 may be configured to store program instructions and/or data accessible by processors(s) 201. In various embodiments, system memory 205 may be implemented using any suitable memory technology, such as static RAM (SRAM), synchronous dynamic RAM (SDRAM), nonvolatile/Flash-type memory, or any other type of memory.

Chipset 202 may also provide access to a graphics processor 207. In certain embodiments, graphics processor 207 may be comprised within a video or graphics card that has been installed as components of the portable communications device 200. Graphics processor 207 may be coupled to the chipset 202 via a graphics bus 206 such as provided by an AGP (Accelerated Graphics Port) bus, a PCIe (Peripheral Component Interconnect Express) bus. The graphics processor 207 generates display signals that are provided to a display device 208, such as a tablet display screen. In certain embodiments, the display device 208 may be a touchscreen display configured to receive manual inputs, such as finger gestures and/or stylus inputs.

The chipset 202 of the communications device 200 may also include one or more hard disk and/or solid-state drives 215. As illustrated, the operating system 220 of the communications device 200 may be stored in the hard disk and/or solid-state drive 215. The communications device 200 may be configured to operate using a specially-adapted operating system 220, or operating system kernel, that implements various security procedures, such as the described authentication of the resident using a voice print, fingerprint or other biometric input recognition. The operating system 220 of the communications device 200 may also restrict the software applications and services that may be used by a resident. The operating system 220 may also be configured to prevent the resident from installing or modifying any applications on the device, thus limiting the resident to the use of software programs authorized for use by the resident communications system.

In certain embodiments, chipset 202 may be coupled to a first network interface 209a, such as provided by a Network Interface Controller (NIC). As described, a communications device 200 such as portable communications device 110, may be limited with regard to the network connectivity and network bandwidth that is supported by the device. In certain embodiments, the network interface 209a may be configured to restrict the wireless networks to which a portable communications device may be connected. For instance, network interface 209a may be a wireless network adapter that is configured to allow the communications device 200 to connect only to a specific wireless network provided by the resident communications system. In certain embodiments, network interface 209a may be configured to issue and alert notifying the resident communications system if any unrecognized wireless networks are detected by the communications device 200.

In certain embodiments, the bandwidth available via the network interface 209a may be limited. Network interface 209a may be configured to limit the maximum bandwidth that is available to the communications device 200 via this network interface 209b. In certain scenarios, such maximum bandwidth limitations may be applicable to all applications installed on the communications device 200. In other scenarios, such maximum bandwidth limitations may only be applicable to certain applications on the communications device, such as gaming and entertainment applications. In certain embodiments, the bandwidth limitations of the network interface 209a may be enforced via the wireless access points 115 providing the available bandwidth.

In certain embodiments, communications device 200 may include a second network interface 209b that is not subject to any bandwidth limitations, but is not available to support gaming services except for periodic administration of the gaming services available on the communications device 200. In certain embodiments, the second network interface 209b may be a wired connection interface that may be used to directly couple the communications device 200 to the resident applications system 105. For instance, the second network interface 209b supported by the communications device 200 may be a USB network interface supporting high-bandwidth connections to the resident application system 105. Other embodiments may utilize various other connection technologies for supporting high-bandwidth connections. In certain embodiments, the second network interface 209b may be a wireless network interface used for administering communications device 200, and thus not subject to bandwidth restrictions.

In many scenarios, use of a communications device 200 may be limited based on security protocols implemented by the resident communications systems. For instance, the operating system 220 of the communications device 200 may be configured to require a resident to enter a PIN (Personal Identification Number) assigned to the resident before enabling use of the communications device 200 by the resident. In other embodiments, the communications device 200 may likewise remain disabled until a resident trying to use the device is authenticated via a biometric verification. In certain embodiments, the communications device 200 may be configured to disable certain functions of the device or of the resident software applications installed on the device until the resident is authenticated, such as using voice print recognition of a voice sample provided by the resident in response to a prompt generated by the operating system 220. In the illustrated embodiment, the chipset 202 is configured to utilize I/O ports 210 that support biometric input devices 230, such as a fingerprint reader or a retinal scanner. In certain embodiments, the operating system 220 may boot upon initialization of the communications device 200, but may require authentication of the resident via biometric inputs 230 in order to enable the resident's use of the communications device 200.

In certain embodiments, a communications device 200 may include an RFID (Radio Frequency Identification) reader that is configured to detect RFID transponders worn by residents of the controlled-environment facility. The incorporation of the RFID reader into the communications device 200 provides the ability to authenticate an inmate using the communications device 200. In certain embodiments, the RFID reader of the communications device 200 may be configured to receive reports of biometric information collected from sensors included in the RFID transponder device worn by a resident.

In certain embodiments, a communication device 200, such as portable communications device 110, may include a gyroscope coupled to the communications device 200 via an I/O port 210. Inputs from the gyroscope may be utilized by the monitoring module 240 to detect rough handling of the communications device 200, thus indicating an unsafe level of distress by the resident using the communications device 200. Additional inputs received via the I/O ports 210 of the communications device 200 may include audio captured using a microphone. Captured audio may be utilized by the monitoring module 240 in order to detect high levels of distress in the resident utilizing the communications device 200. If the monitoring module 240 detects high levels of distress or any unapproved behavior during use of provided gaming services, the monitoring module 240 may be configured to direct the gaming module 230 to initiate procedures for suspending gameplay by the resident.

Other inputs received via the I/O ports 210 may receive collected biometric information 230 such as heart rate and/or blood pressure readings. In certain embodiments, communications device 200 may include sensors 230, such as capacitive blood pressure and heart rate sensors, that collect biometric information indicative of a level of distress in the resident using the device. In certain embodiments, communication device 200 may include an RFID reader capable of interfacing with an RFID chip included within a monitoring and tracking device worn by residents, where the monitoring and tracking device includes sensors capable of measuring a level of distress in the resident, such as via the resident's blood pressure and heart rate information.

As described with respect to FIG. 1, the resident communications system may support the use of resident applications, such as education, entertainment and visitation applications. Referring to FIG. 2, upon booting of the communications device 200, and upon instantiation and execution of the operating system instructions 220 stored in the storage drive 215, the operating system 220 provides the resident with access to various software modules, such as a visitation module 225, an education module 235 and a gaming module 230. Certain of these software modules may be installed on the communications device 200, but may remain fully or partially disabled until the resident has been approved for use of the modules.

The software modules supported by operating system 220 may include an education module 235 that provides residents with access to various educational services and resources. These educational services and resources provided via the education module 235 may include various forms of instructional materials, course materials, self-guided learning exercises, access to online classes, training materials, and/or vocational training exercises. In various embodiments, the services provided via the education module 235 may provide residents with various types of resources that promote the education of the resident.

The software modules supported by operating system 220 may also include a visitation module 225 that allows the resident to participate in visitation sessions, such as the visitation sessions described with respect to FIG. 1. In certain embodiments, the visitation module 225 may provide residents with ability to request, schedule and participate in live visitation sessions, such as voice calls and video conferences. In such embodiments, the visitation module 225 may include user interface elements that allow the resident to interface with the visitation system 145 and the resident account system 140 in performing visitation functions such as requesting a visitation session, determining whether the requested visitation is allowed and scheduling a visitation session. The visitation module 225 may also include audio and video capabilities that allow the resident to participate in audio and video visitation sessions. Embodiments of the visitation module 225 may also enable residents to participate in other types of visitations, such as e-mail, text messaging and the exchange of voice and video messages.

In certain embodiments, the visitation module 225 may be configured to interface with the gaming module 230 in order to provide gaming progress reports to other individuals, such as friends and family of resident. In certain scenarios, funds used to purchase gaming credits for a resident may be contributed by friends and family of the resident. In certain embodiments, the purchase of gaming credits by friends and family may include an option to receive progress reports for the gameplay purchased by the gaming credits. In such embodiments, the visitation module 225 may receive such progress reports from the gaming module 230 and may dispatch a notification, including the progress report, to the resident applications system 105. In such embodiments, the notifications may be transmitted via the restricted-bandwidth connection from the communications device 200 to the resident applications system 105. The visitation system 145 may then be utilized to dispatch a progress report message, such as a text message or social media message, to the friends and family that have elected to receive such notifications.

In various embodiments, a communications device 200 does not include each of the components shown in FIG. 2. In various embodiments, communications device 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as a systems-on-a-chip.

FIG. 3 is a flowchart diagram illustrating certain steps of a process according to various embodiments for providing temporary access to video games loaded on a resident device. In the illustrated embodiments, the process begins at step 305 with the connection of a resident device to the gaming service via a high-bandwidth connection, such as a wired connection. As described, the resident device may be a portable computing device, such as a tablet or smartphone, issued to the resident on a temporary or permanent basis. Bandwidth limitations in supporting software applications installed on the resident device may require limiting certain aspects of administering the resident device to be conducted via designated high-bandwidth network connections, such as a wired connection, to the resident device. In certain embodiments, the resident device may support a high-bandwidth network interface, such as a USB connection, to the gaming service used to administer gaming features supported by the resident device. As described, in certain embodiments, the resident device may be coupled to the gaming service via a wired connection to a network router that is coupled to the gaming service. In other embodiments, the resident device may be coupled to a device that is accessible by the the gaming service.

With the resident device coupled to the gaming service, at step 310, the gaming service determines video games that are available to the particular resident and the particular resident device. As described, the resident device may be configured with sensors that collect biometric information identifying the resident using the resident device. In this manner, the resident utilizing a resident device may be identified. Based on such an identity determination of the resident, the gaming service may refer to the resident account system 140 in order to determine applicable restrictions on the resident's use of the gaming service. For instance, a privilege status classification associated with the resident may limit the resident to certain games that do not include violence or stressful scenarios.

The gaming service may also determine the games available to the resident based on the resident device itself. For instance, limited storage on the resident device may preclude downloading certain games to the resident device. In certain embodiments, the resident may be able to designate specific games that have been downloaded to the resident device that the resident wants to replace and/or keep on the device. Based on such designations, the gaming service may determine the space available on the resident device for downloading new games to the resident device. In certain embodiments, the gaming service may query the gaming module on the resident device in order to determine which downloaded games the resident has been using. The gaming service may refrain from replacing any downloaded game on the resident device that includes saved progress by resident. Based on the available space and other restrictions of the resident device and the restrictions applicable to the user, the gaming service may thus determine games to be downloaded to the resident device.

At step 315, the games selected by the gaming service are downloaded to the resident device via the high-bandwidth connection between the gaming service and the resident device. In certain embodiments, the gaming service may also collect various logs pertaining to the resident's gaming activity as part of this download process. In certain scenarios, the resident device may generate logs of biometric readings taken during the resident's use of the downloaded computer programs. Such logs may be utilized by the gaming service to establish individual baselines for a resident's physiological state during use of a particular downloaded game. The gaming service may calculate such baselines and provide them to the monitoring module of the resident device for use in detecting unsafe use of the resident device during gameplay of the downloaded games. Upon completion of all such tasks for administering the gaming system provided via the resident device, at step 320 the resident device is disconnected from the high-bandwidth connection to the gaming service.

The resident may now begin use of the resident device, which now includes games downloaded from the gaming service. Upon being authenticated, such as via PIN entry or via biometric indicators, the resident may access the gaming module on the resident device. The gaming module may include a user interface allowing the resident to request temporary access to one of the games downloaded to the resident device. At step 325, a request is issued from the gaming module of the resident device to the gaming service seeking the temporary access to the downloaded game selected by the resident. The request is issued by the resident device via the restricted-bandwidth connection to the gaming service, such as the wireless connection provided via wireless access point 115.

Upon receiving such a request from resident device, at step 330, the gaming service determines whether the resident is authorized to access the requested game. In certain embodiments, the gaming service may refer to one or more schedules maintained by resident account system 140 in order to determine whether the resident is currently allowed use of the gaming service. The gaming service may also refer to one or more account balances maintained by the resident account system 140 in order to determine whether gaming credits or funds are available for the resident's requested access to the downloaded game. As described, friends and family of the resident may contribute funds that may be used by the resident to purchase gaming credits to the provided gaming services. In addition to providing funds generally, friends and family of the resident may also be allowed to purchase access to specific games for the resident, such as by purchasing gaming credits for a particular game downloaded on the resident's device. In such scenarios, such purchases may be designated within the resident account system 140 and accessed by the gaming system at step 330.

At step 335, the gaming service generates a key that enables temporary access to the requested game that was previously downloaded to the resident device. In certain embodiments, the key may specify a duration of the temporary access to the requested game. For instance, the key may specify that the resident is allowed one hour of access to the requested game. In other embodiments, the key may specify one or more milestones within the requested game, thus allowing the resident access to the requested game until reaching one or more of the milestones of progress within the game. In this manner, residents may be provided with a guaranteed amount of game play regardless of the amount of funds that are available for purchasing temporary access keys.

The generated key is transmitted from the gaming service to the resident device at step 340. The key is transmitted to the resident device via the restricted-bandwidth connection between the resident device and the gaming service. At step 345, the gaming module on the resident device validates the key and provides the resident with the requested temporary access to the requested game. The resident device may utilize various features of the monitoring system 240 in order to track and monitor the resident's use of the requested game during the temporary access period. As described, the monitoring system may interoperate with sensors integrated in the resident device in order to collect biometric indicators and/or environmental data that may indicate unsafe use of the resident device during the temporary access to the downloaded games.

At step 350, the resident's temporary use of the downloaded game is monitored in order to determine whether the temporary authorization key has expired. As described, the authorization key may specify a duration of temporary use of a game by a resident. In such scenarios, the key is determined to be expired upon detecting the duration of the temporary access has exceeded the duration specified by the key. Also as described, the authorization key may specify one or more specific progress milestones within a downloaded game. In such scenarios, the gaming module of the resident device may be configured to receive progress notifications from the downloaded games. Based on such progress notifications, the gaming module may determine whether the resident's progress has reached one of the milestones specified by the authorization key.

If the authorization key is determined to be expired, at step 355, the gaming module may save the resident's current progress in the current game. By saving the resident's current progress, the resident may resume the game at a later time from the point at which the authorization key is determined to be expired. With the progress saved, at step 360, the temporary access to the game is revoked. In certain embodiments, the resident's progress may be reported to the gaming service via the restricted-bandwidth connection. In such embodiments, the gaming service may be configured to provide notification of the reported progress to one or more individuals, where these individuals may be friends and family of the resident and/or other residents. In certain of such embodiments, friends and family that have purchased gaming credits for a specific game may receive notifications of the resident's progress in that specific game.

The foregoing has outlined rather broadly the features and technical advantages of the present invention in order that the detailed description of the invention that follows may be better understood. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A communications device for providing gaming services to a resident of a controlled-environment facility, the device comprising:
   a first network interface configured to establish a restricted-bandwidth connection with a gaming system via one or more network access points located within the controlled-environment facility;
   a second network interface configured to establish a second connection with the gaming system via a high-bandwidth connection;
   a memory device configured to store operating system program instructions; and
   one or more processors configured to execute the operating system program instructions, causing the communications device to:
      connect with the gaming system via the high-bandwidth connection to download one or more games to the memory device;
      issue a request for the resident to access a first game of the one or more downloaded games, wherein the request is issued to the gaming system via the restricted-bandwidth connection;
      receive, via the restricted-bandwidth connection, an authorization key authorizing a temporary access to the first game; and
      allow the resident to utilize the first game until expiration of the authorization key is detected.

2. The communications device of claim 1, further comprising:
   one or more sensors configured to collect biometric indicators, wherein the operating system program instructions further cause the communications device to require positive identification of the resident based on collected biometric indicators prior to issuing the request for access to the first game.

3. The communications device of claim 2, wherein the operating system program instructions further cause the communications device to periodically require positive re-identification of the resident based on collected biometric indicators during the temporary access to the first game by the resident.

4. The communications device of claim 1, wherein the authorization key expires upon expiration of a first duration of access to the first game by the resident.

5. The communications device of claim 1, wherein the authorization key expires upon the resident reaching one or more progress milestones in the first game.

6. The communications device of claim 1, wherein the operating system program instructions further cause the communications device to save a progress of the resident in the first game upon detecting the expiration of the authorization key and further configured to revoke the temporary access to the first game upon saving the progress.

7. The communications device of claim 1, wherein the operating system program instructions further cause the communications device to provide the resident with an interface for selecting a plurality of the downloaded one or more games to be replaced in a subsequent high-bandwidth connection to the gaming service.

8. A system for providing a resident of a controlled-environment facility with gaming services, the system comprising:
   one or more network access points coupled to a gaming service;
   the gaming service configured to communicate with a resident communications device via a restricted-bandwidth connection supported by the one or more access points and further configured to communicate with the resident communications device via a high-bandwidth connection, and further configured to download one or more games to the resident communications device via the high-bandwidth connection, and further configured to receive a request via the restricted-bandwidth connection for temporary access to a first game of the downloaded one or more games, and further configured to issue an authorization key to the resident communication device via the restricted bandwidth connection, wherein the authorization key authorizes temporary access by the resident to the first game; and
   the resident communications device assigned to the resident, wherein the communications device is configured to connect to the gaming service via the high-bandwidth connection to download the one or more games, and further configured to issue the request via the restricted-bandwidth connection for the resident to access to the first game, and further configured to receive the authorization key from the gaming service via the restricted-bandwidth connection, and further configured to allow the resident to utilize the first game until expiration of the authorization key is detected.

9. The system of claim 8, wherein the resident communications device comprises one or more sensors configured to collect biometric indicators, and wherein the communications device requires positive identification of the resident based on collected biometric indicators prior to issuing the request for access to the first game.

10. The system of claim 9, wherein the communications device is further configured to periodically require positive re-identification of the resident based on collected biometric indicators during the temporary access to the first game by the resident.

11. The system of claim 8, wherein the authorization key expires upon expiration of a first duration of access to the first game by the resident.

12. The system of claim 8, wherein the authorization key expires upon the resident reaching one or more progress milestones in the first game.

13. The system of claim 8, wherein the communications device is further configured to save a progress of the resident in the first game upon detecting the expiration of the authorization key and further configured to revoke the temporary access to the first game upon saving the progress.

14. The system of claim 8, wherein the communications device is further configured to provide the resident with an interface for selecting a plurality of the downloaded one or more games to be replaced in a subsequent high-bandwidth connection to the gaming service.

15. A method for providing a resident of a controlled-environment facility with gaming services via a communications device utilized by the resident, the method comprising:
   establishing a first connection with the communications device via a high-bandwidth connection;
   determining one or more games available to the resident;
   downloading a plurality of the one or more games to the resident device via the high-bandwidth connection;
   receiving a request for the resident to access a first game of the one or more downloaded games, wherein the request is received via a restricted-bandwidth connection provided via one or more network access points located within the controlled-environment facility;

generating a key authorizing a temporary access to the first game, wherein the duration of the temporary access is determined based on gaming credits available to the resident;

transmitting the key to the resident device via the restricted-bandwidth connection; and receiving a notification that the key has expired from the resident device via the restricted-bandwidth connection.

16. The method of claim 15, wherein the downloading of the plurality of games further comprises:

determining one or more game previously downloaded to the communications device;

identifying saved progress on the resident device for the one or more previously downloaded games;

determining one or more previously downloaded games to be uninstalled from the resident device, wherein the games to be uninstalled do not include the games with saved progress; and downloading the plurality of games to the communication device by replacing one or more of the games to be uninstalled.

17. The method of claim 15, wherein the key expires upon expiration of a first duration of access to the first game by the resident.

18. The method of claim 15, wherein the key expires upon the resident reaching one or more progress milestones in the first game.

19. The method of claim 16, wherein the games to be uninstalled also do not include one or more of the downloaded games that have been designated by the resident.

20. The method of claim 15, wherein the one or more games available to the resident are determined based on a privilege status classification of the resident.

* * * * *